(12) United States Patent
Jeong

(10) Patent No.: US 9,008,418 B2
(45) Date of Patent: Apr. 14, 2015

(54) IMAGE PRODUCTION METHOD AND APPARATUS FOR MOBILE TERMINAL

(75) Inventor: Moon Sang Jeong, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1179 days.

(21) Appl. No.: 12/019,300

(22) Filed: Jan. 24, 2008

(65) Prior Publication Data

US 2008/0298705 A1    Dec. 4, 2008

(30) Foreign Application Priority Data

May 29, 2007 (KR) ........................ 10-2007-0051887

(51) Int. Cl.

| | |
|---|---|
| G06K 9/00 | (2006.01) |
| G06K 9/46 | (2006.01) |
| G06K 9/66 | (2006.01) |
| G06K 9/40 | (2006.01) |
| G09G 5/02 | (2006.01) |
| H04N 1/60 | (2006.01) |
| H04N 1/00 | (2006.01) |
| G06T 11/60 | (2006.01) |
| H04N 1/387 | (2006.01) |
| H04N 101/00 | (2006.01) |

(52) U.S. Cl.
CPC .......... *H04N 1/3872* (2013.01); *H04N 2101/00* (2013.01); *H04N 1/00442* (2013.01); *H04N 1/00458* (2013.01); *H04N 1/00307* (2013.01); *H04N 1/0044* (2013.01); *G06T 11/60* (2013.01); *H04N 1/00461* (2013.01); *H04N 1/00183* (2013.01)

(58) Field of Classification Search
USPC .......... 382/162, 167, 190, 254, 274; 345/581, 345/589; 358/1.9
See application file for complete search history.

(56) References Cited

U.S. PATENT DOCUMENTS

| | | | | |
|---|---|---|---|---|
| 4,303,912 | A * | 12/1981 | Stafford et al. | 345/603 |
| 2001/0021937 | A1* | 9/2001 | Cicchitelli et al. | 707/517 |
| 2004/0032599 | A1* | 2/2004 | Atkins et al. | 358/1.9 |
| 2004/0184057 | A1* | 9/2004 | Nakabayshi et al. | 358/1.9 |
| 2005/0062888 | A1* | 3/2005 | Wood et al. | 348/553 |
| 2006/0092487 | A1* | 5/2006 | Kuwabara et al. | 358/537 |
| 2007/0050718 | A1* | 3/2007 | Moore et al. | 715/744 |
| 2007/0070081 | A1* | 3/2007 | Tang et al. | 345/591 |
| 2007/0096024 | A1* | 5/2007 | Furuya et al. | 250/332 |
| 2007/0236729 | A1* | 10/2007 | Yoda | 358/1.15 |
| 2007/0257933 | A1* | 11/2007 | Klassen et al. | 345/593 |
| 2008/0104516 | A1* | 5/2008 | Lee | 715/732 |
| 2008/0267536 | A1* | 10/2008 | Moroney et al. | 382/311 |

FOREIGN PATENT DOCUMENTS

| | | |
|---|---|---|
| KR | 200362667 | 9/2004 |
| KR | 1020050074254 | 7/2005 |

\* cited by examiner

*Primary Examiner* — Bernard Krasnic
(74) *Attorney, Agent, or Firm* — H.C. Park & Associates, PLC

(57) ABSTRACT

An image production method and apparatus are disclosed for a mobile terminal. The image production method includes selecting photographs and applying editing effects associated with color information of at least one of the selected photographs to image data of the selected photographs to produce an output image.

18 Claims, 4 Drawing Sheets

IMAGE PRODUCTION METHOD AND APPARATUS FOR MOBILE TERMINAL

CROSS REFERENCE TO RELATED APPLICATION

This application claims priority from and the benefit of Korean Patent Application No. 10-2007-0051887, filed on May 29, 2007, which is hereby incorporated by reference for all purposes as if fully set forth herein.

BACKGROUND OF THE INVENTION

1. Field of the Invention

The present invention relates generally to a mobile terminal and, more particularly, to an image production method and apparatus for a mobile terminal.

2. Discussion of the Background

Advances in information and communication technologies and semiconductor technologies have enabled worldwide popularization of mobile terminals. In addition to conventional voice calls and text message services, advanced mobile terminals support various functions related to wireless Internet, wireless short-range communication, and digital broadcast reception. Usability factors such as size, design, resolution, and user interface have also greatly improved.

With convergence trends, multi-purpose mobile terminals have been developed. Radio phones, TV phones, Internet phones, and camera phones are examples of multi-purpose mobile terminals, which enable radio broadcast reception, television broadcast reception, Internet access, and photograph-taking, respectively, in addition to mobile communication.

In particular, a camera-equipped mobile terminal, also known as a camera phone, enables the user to take and save photographs. The user can subsequently view a saved photograph, use a saved photograph as wallpaper, or transmit a saved photograph using an electronic mail address or telephone number.

However, to edit a photograph taken by a camera phone, the user may have to transfer the photograph to a computer. Hence, it would be desirable to provide a camera-equipped mobile terminal with an enhanced photograph editing function.

SUMMARY OF THE INVENTION

The present invention provides an image production method and apparatus for a mobile terminal, wherein one or more photographs can be edited to produce a new image.

Additional features of the invention will be set forth in the description which follows, and in part will be apparent from the description, or may be learned by practice of the invention.

The present invention discloses an image production method for a mobile terminal, including selecting photographs and applying editing effects associated with color information of at least one of the selected photographs to image data of the selected photographs to produce an output image.

The present invention also discloses an image production apparatus for a mobile terminal, including a control unit and a display unit. The control unit applies, upon selection of photographs, editing effects associated with color information of at least one of the selected photographs to image data of the selected photographs to produce an output image. The display unit displays the output image such that the selected photographs are switched with one another in a preset sequence.

The present invention also discloses an image production method for a mobile terminal including selecting photographs from a photograph list, setting a display sequence for the selected photographs, collecting color information from the selected photographs, and applying editing effects associated with the color information of the selected photographs to image data of the selected photographs to produce an output image.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
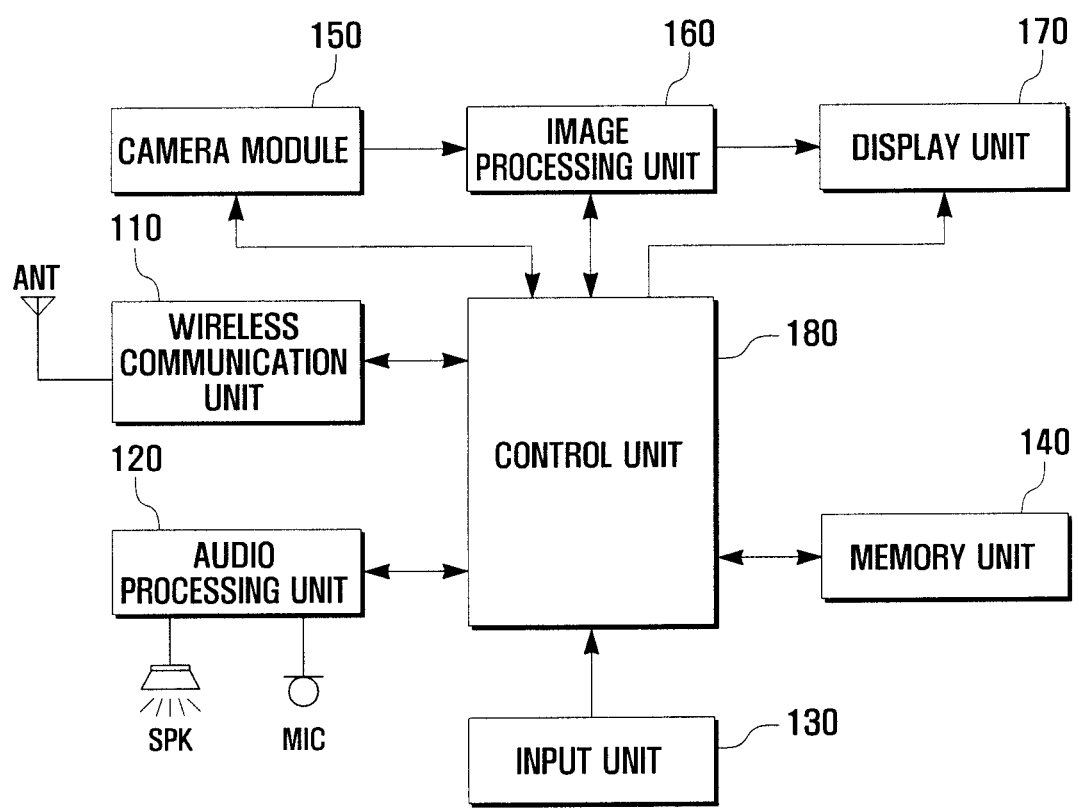
FIG. 1 is a schematic block diagram showing a mobile terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

For the purpose of description, a mobile communication terminal is a mobile terminal in exemplary embodiments of the present invention. However, the present invention is not limited to a mobile communication terminal. The mobile terminal of exemplary embodiments of the present invention may be any information and communication appliance or multimedia appliance, such as a mobile communication terminal, a digital broadcast receiving terminal, a personal digital assistant (PDA), a smart phone, an international mobile telecommunications 2000 (IMT 2000) terminal, a wideband code division multiple access (WCDMA) terminal, or a universal mobile telecommunications system (UMTS) terminal.

In the mobile terminal of exemplary embodiments of the present invention, color coordinates in a particular color coordinate system may be used to represent colors in a standard manner. In a color coordinate system, a coordinate value denotes a point that corresponds to a particular color.

Color information may be derived using RGB color coordinates. YUV, YCbCr, or HSI color coordinates may also be used.

With RGB color coordinates, three primary colors of light (red, green and blue) are used. Red, green, and blue light are added together in various ways to reproduce a broad array of non-primary colors (additive color mixing). With YUV color coordinates, Y is a brightness component (luminance), and U and V are color components (chrominance). The fact that human eyes are more sensitive to the intensity of light than the color of light is utilized in the YUV color system. With YCbCr color coordinates, Y is a luminance component, and Cb and Cr are chrominance components whose values are in the range of 0 to 1.

In exemplary embodiments, various color representations may be transformed into one of RGB, YUV, YCbCr and HSI color coordinates for further image processing.

Exemplary embodiments of the present invention relate to automatic production of images using one or more photographs in a mobile terminal. In particular, various editing effects may be applied to automatically produce an output image.

In the following description, it is assumed that three photographs are selected to produce an output image.

Upon selection of three photographs, the mobile terminal generates an output image displaying the selected photographs in sequence like a slide show. The mobile terminal collects color information from at least one of the selected photographs, applies editing effects to the selected photographs on the basis of the collected color information and the number of selected photographs, and automatically creates an output image.

For a single photograph, the color information may include color temperature, color distribution, brightness, and saturation, as color information elements. For two or more photographs, the color information may further include differences between corresponding color information elements (color temperature, color distribution, brightness, and saturation) of multiple photographs, and average color information of multiple photographs. Editing effects may include photographic effects, transition effects, and sound effects.

Photographic effects are related to changes in attributes of a photograph. Various photographic effects are applicable to a photograph. For example, a photograph may be sharpened or blurred, and the contrast of the photograph may be increased or decreased, through application of corresponding photographic effects.

Transition effects may include the speed and manner of transitions between screens, wherein the current photograph disappears from the screen and the next photograph is displayed on the screen. For example, the speed of screen transitions may be increased or decreased, and a fade-in or fade-out effect may be applied to displayed photographs.

Sound effects may include the playing of background music during display of images. The type, tempo, and volume of background music may be adjusted according to color information.

Editing effects may include a color information element, and a lower limit and an upper limit are set to the color information element. Each editing effect may be applied within the corresponding range between the lower limit and upper limit according to color information. Editing effects are described next in connection with color information.

Editing effects are described below with regard to color information elements of a photograph including color temperature, color distribution, brightness, and saturation.

The color temperature is a measure of the color of a light source relative to a black body at a particular temperature expressed in the Kelvin scale (K). As the temperature of a light source increases, the color of the light source changes from red through orange and white to blue. For example, color temperatures of daylight, an incandescent lamp of 200 W, and a fluorescent lamp of daylight blue are about 5,500 K, 3,000 K, and 6,500 K, respectively.

Table 1 shows examples of editing effects set according to color temperature.

TABLE 1

| color temperature | color | editing effect |
| --- | --- | --- |
| 3,000~4,000 K | Red | theme 13 |
| 4,000~5,000 K |  | theme 14 |
| 5,000~6,000 K | white | theme 15 |
| 6,000~7,000 K |  | theme 16 |
| 7,000~8,000 K |  | theme 17 |
| 8,000~9,000 K |  | theme 18 |
| 9,000~10,000 K | blue | theme 19 |

Referring to Table 1, for the purpose of setting editing effects, the lower limit of the color temperature is set to 3,000 K, and the upper limit is set to 10,000 K. The color temperature range is then divided into sub-ranges, which are associated with applicable editing effects as themes 13, 14, 15, 16, 17, 18, and 19. If the color temperature is less than or equal to 3,000 K, theme 13 is applied. If the color temperature is greater than or equal to 10,000 K, theme 19 is applied.

Editing effects associated with a particular theme may include a photographic effect, a transition effect, and a sound effect, depending upon the color temperature corresponding to the theme.

For example, a color temperature of about 3,000 K corresponds to red and a mild and warm feeling, and a color temperature of about 10,000 K corresponds to blue and a bright and fresh feeling.

Hence, the theme 13 may be associated with a photographic effect for blurred photographs, a transition effect for slow photograph transitions, and a sound effect for calm background music with slow tempo and low volume. As the color temperature approaches 3,000 K, editing effects similar to those of the theme 13 may be applied.

The theme 19 may be associated with a photographic effect for sharpened photographs, a transition effect for fast photograph transitions, and a sound effect for lively background music with fast tempo and high volume. As the color temperature approaches 10,000 K, editing effects similar to those of the theme 19 can be applied.

Color is perceived by the human eye and brain as it interacts with the spectrum of light (distribution of light energy versus wavelength). Color distribution is a measure of the diversity of colors.

For the purpose of setting editing effects, similarly to the setting of the color temperature, the lower limit of the color distribution is set to 1 for lowest color diversity and the upper limit is set to 10 for highest color diversity. The color distribution range is then divided into sub-ranges, which are associated with applicable editing effects as themes.

Then, for example, when the color distribution is very diverse, a corresponding theme may be set that is associated with a photographic effect for sharpened photographs, a transition effect for fast photograph transitions, and a sound effect for lively background music with fast tempo and high volume.

When the color distribution is very uniform, a corresponding theme may be set that is associated with a photographic effect for blurred photographs, a transition effect for slow photograph transitions, and a sound effect for calm background music with slow tempo and low volume.

Saturation is a measure of color purity, or dilution of color by white. A saturation of 0% indicates white, and a saturation of 100% indicates pure color. Table 2 shows examples of editing effects set according to color saturation.

TABLE 2

| saturation | Color | editing effect |
| --- | --- | --- |
| 0%~10% | low saturation | theme 21 |
| ... | ... | ... |
| 40%~50% | ... | theme 25 |
| ... | ... | ... |
| 90%~100% | high saturation, pure color | theme 30 |

Referring to Table 2, for the purpose of setting editing effects, similarly to the setting of the color temperature, the lower limit of the color saturation is set to 0% and the upper limit is set to 100%. The color saturation range is then divided into sub-ranges spanning 10% intervals, which can be associated with applicable editing effects as themes 21, 22, 23, 24, 25, 26, 27, 28, 29, and 30.

Brightness is a measure of how bright or luminous a color is, and denotes the amount of light. For the purpose of setting editing effects, similarly to the setting of the color temperature, the lower limit of the brightness is set to 0% for the lowest brightness and the upper limit is set to 100% for the highest brightness. The brightness range is then divided into sub-ranges, which can be associated with applicable editing effects as themes.

Hereinabove, editing effects are described in connection with color information of a single photograph. The editing effects may further include changes in color information between photographs and the average color information of multiple photographs.

When two or more photographs are selected, changes in color information between photographs and the average color information of multiple photographs are considered. That is, corresponding color information elements of multiple photographs may be compared with each other or averaged. For the purpose of setting editing effects, lower and upper limits may be set to the change in a color information element. Then, the change range between the lower limit and upper limit is divided into sub-ranges, which can be associated with applicable editing effects as themes.

As described above, editing effects as themes may be set to individual color information elements, and themes of editing effects corresponding to color information of a photograph may be applied to produce an output image.

FIG. 1 is a schematic block diagram showing a mobile terminal according to an exemplary embodiment of the present invention.

Referring to FIG. 1, the mobile terminal includes a wireless communication unit 110, an audio processing unit 120, an input unit 130, a memory unit 140, a camera module 150, an image processing unit 160, a display unit 170, and a control unit 180.

The wireless communication unit 110 performs wireless transmission and reception operations to send and receive user data and voice calls. The user data includes image data, such as still images and moving images, and audio data, such as MP3 audio files.

The wireless communication unit 110 converts a modulated signal from the control unit 180 into an intermediate frequency (IF) signal, further converts the IF signal into a radio frequency (RF) signal, and transmits the RF signal through an antenna ANT to a corresponding base station. The wireless communication unit 110 converts an RF signal received through the antenna ANT from a corresponding base station into an IF signal, further converts the IF signal into a baseband signal, and sends the baseband signal to the control unit 180.

The audio processing unit 120 reproduces an audio signal from the control unit 180 through a speaker SPK, and sends an audio signal, such as a voice signal from a microphone MIC, to the control unit 180.

The input unit 130 includes a plurality of alphanumeric and function keys for inputting alphanumeric information and setting various functions. The input unit 130 transmits key signals from the user for setting and controlling the mobile terminal to the control unit 180.

The memory unit 140 stores application programs for exemplary embodiments of the present invention, downloaded digital contents, and data created by the user.

The memory unit 140 may include a program storage section and a data storage section. The program storage section stores an operating system (OS) to boot the mobile terminal, and application programs for supplementary functions. The data storage section stores user data generated from the use of the mobile terminal, such as audio files and image files including still and moving images. The mobile terminal may be used to take a picture, receive a multimedia message, and download files from an Internet site.

The memory unit 140 may provide a buffer space to temporarily store user data, such as songs, still images and moving images, generated from execution of application programs related to photographing, playback of audio and video, and image editing.

The camera module 150 obtains a data signal by photographing a target object, and converts the data signal into an image signal using an encoder (not shown), under the control of the control unit 180.

The image processing unit 160 converts an analog signal, such as an image signal from the camera module 150, into a digital signal, and generates screen data to display image data from the camera module 150. That is, the image processing unit 160 compresses and decompresses screen data according to display characteristics of the display unit 170.

The display unit 170 displays image data from the image processing unit 160, menus and function settings of the mobile terminal, information input by the user, and information to be provided to the user. The display unit 170 may include a liquid crystal display (LCD) panel, an LCD controller to control LCD devices, and video memory to temporarily store video data. If the panel has touch screen capability, the display unit 170 can also act as an input device performing in part or whole the function of the input unit 130.

The control unit 180 controls the overall operation of the mobile terminal, and signal exchange between internal components thereof. That is, the control unit 180 controls signal exchange between the wireless communication unit 110, the audio processing unit 120, the input unit 130, the memory unit 140, the camera module 150, the image processing unit 160, and the display unit 170.

The control unit 180 executes a requested function of the mobile terminal according to an input signal from the input unit 130 (for example, a key input signal or a touch event caused by a touch to a touch screen), and controls the display unit 170 to display the current state of the function in execution and information to be provided to the user such as a menu.

In particular, the control unit 180 collects, upon selection of one or more photographs by the user, color information from at least one of the selected photographs, and produces an output image by applying preset editing effects corresponding to the collected color information.

Although not shown, the mobile terminal of exemplary embodiments of the present invention may further include any of a digital broadcast receiving module, a charge terminal, a digital audio playing module such as an MP3 module, and an auxiliary connection unit, such as a slot for removable storage media and a terminal to exchange data with an external digital appliance.

With the digital convergence trend, it should be apparent to those skilled in the art that the mobile terminal of exemplary embodiments of the present invention may further include a unit other than the above-described units.

Figure 2:
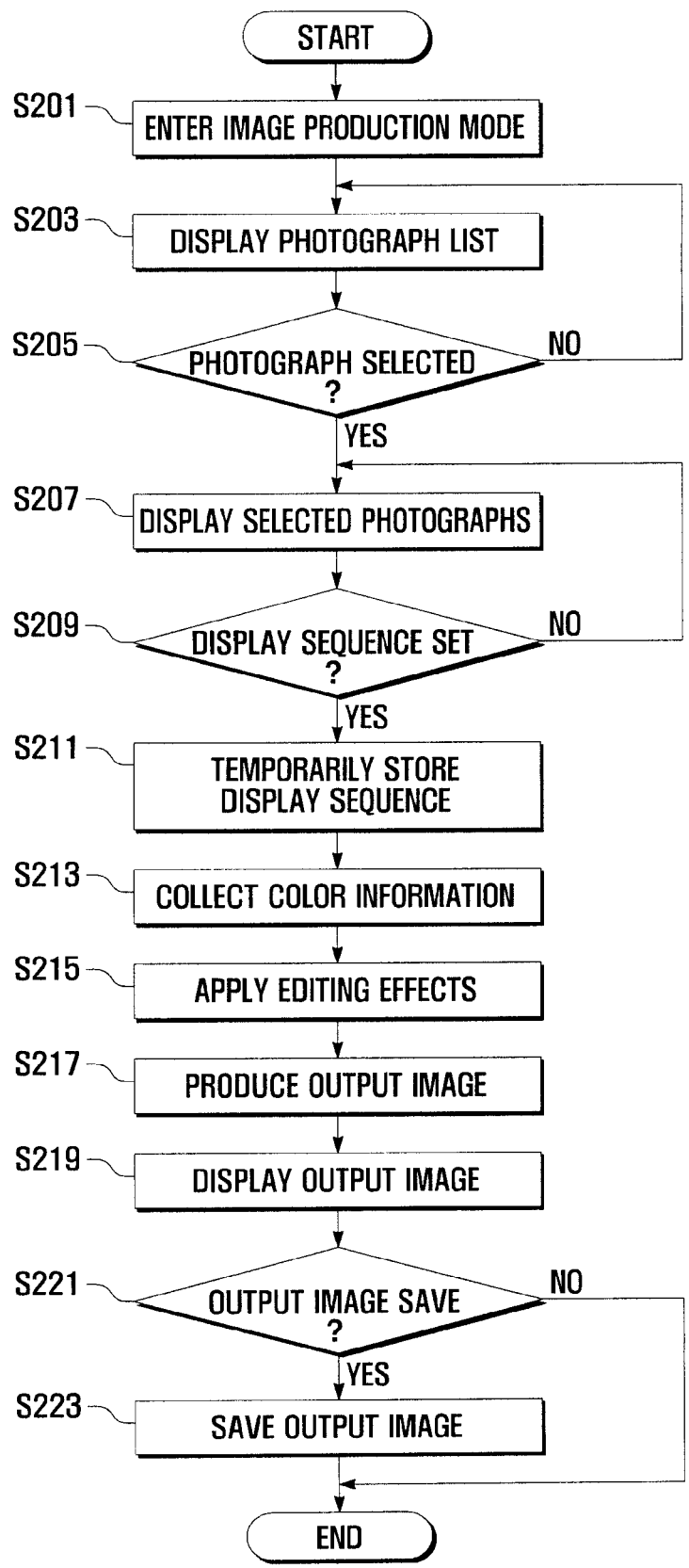
FIG. 2 is a flow chart showing an image production method according to another exemplary embodiment of the present invention.
Figure 3A:
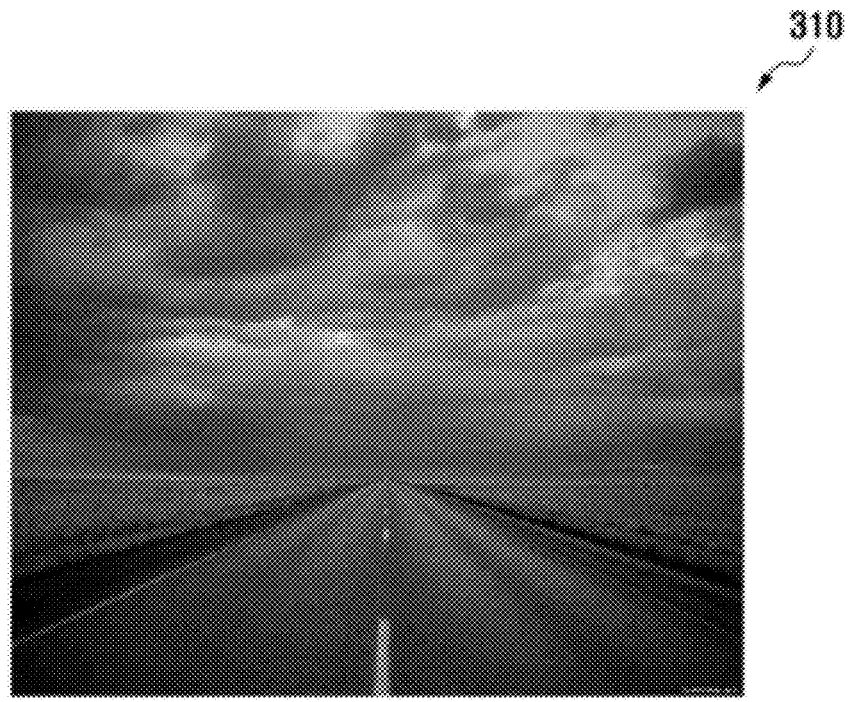
FIG. 3A, FIG. 3B, and FIG. 3C are photographs showing an image production process in the method of FIG. 2.
Figure 3B:
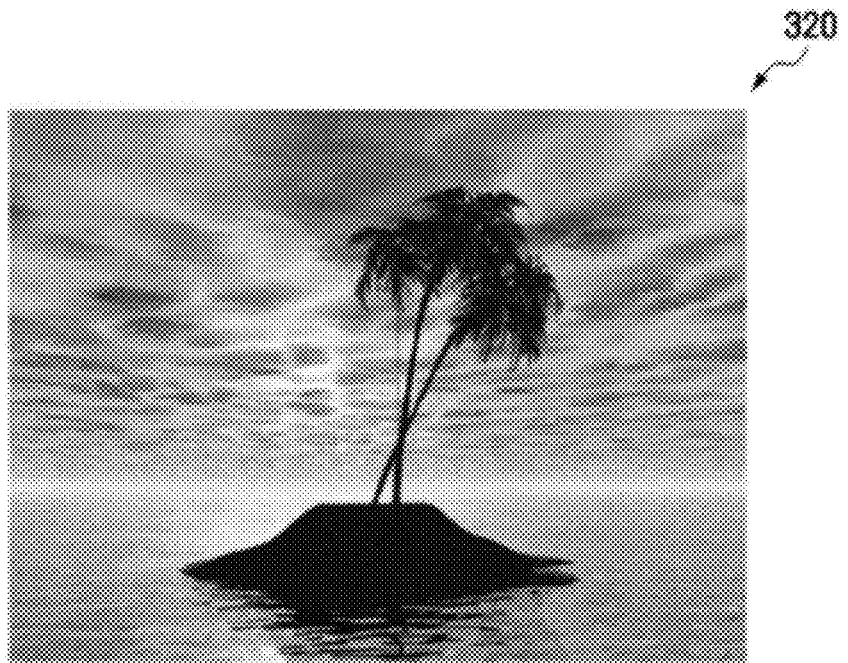
Figure 3C:
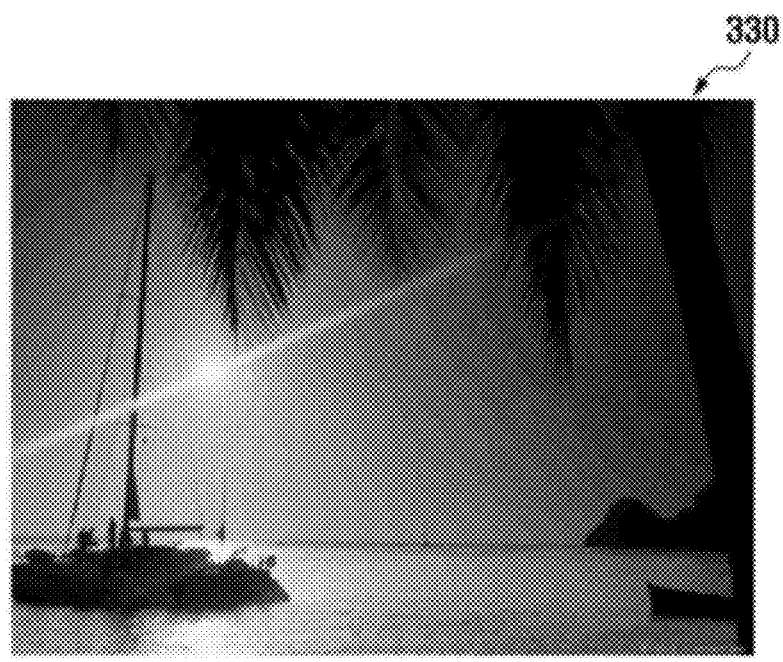

FIG. 2 is a flow chart showing an image production method according to another exemplary embodiment of the present invention. FIG. 3A, FIG. 3B, and FIG. 3C are photographs showing an image production process in the image production method.

Referring to FIG. 2, the control unit 180 of the mobile terminal, in response to selection of an image menu item by the user, enters an image production mode (S201).

In the image production mode, the control unit 180 displays a list of photographs on the display unit 170 (S203). The photograph list can be displayed as thumbnail images so that multiple photographs may be previewed at a time.

The photograph list includes all photographs created or obtained through the use of the mobile terminal. For example, the photograph list may include photographs taken by the camera module 150, photographs downloaded through the wireless communication unit 110, and photographs received from a removable storage medium or another mobile terminal.

The user may select one or more photographs in the displayed list. For the purpose of description, as shown in FIG. 3A, FIG. 3B, and FIG. 3C, it is assumed that a first photograph 310, second photograph 320, and third photograph 330 are selected by the user.

When one or more photographs are selected (S205), the control unit 180 displays the selected photographs (S207). The user may set a display sequence of the selected photographs. It is assumed that the user sets the display sequence such that the first photograph 310, second photograph 320, and third photograph 330 are to be displayed in order. When the user sets the display sequence (S209), the control unit 180 temporarily stores the set display sequence (S211).

The control unit 180 collects color information from at least one of the selected photographs (the first, second, and third photographs 310, 320, and 330) (S213). For a photograph, the color information includes color temperature, color distribution, brightness, and saturation, as color information elements. For two or more photographs, the color information further includes differences between corresponding color information elements (color temperature, color distribution, brightness, and saturation) of the photographs, and average color information of the photographs.

For the convenience of description, editing effects are described in connection with the color information of a single selected photograph. Editing effects may be set and applied in connection with the color information of multiple selected photographs.

As can be seen, the first, second, and third photographs 310, 320, and 330 depict a glow in the sky. As a result of color information collected from the first photograph 310, it is assumed that the control unit 180 obtained values of 3,500 K, 2, 20%, and 30% for the color temperature, color distribution, saturation, and brightness, respectively.

Thereafter, the control unit 180 applies themes of editing effects corresponding to the collected color information to the image data of the selected photographs (S215), and produces an output image using the edited image data (S217).

For example, as the color temperature, color distribution, saturation, and brightness are 3,500 K, 2, 20%, and 30%, respectively, the control unit 180 may blur the first, second, and third photographs 310, 320, and 330 in the output image as a photographic effect. The control unit 180 can also lower the speed of transitions between the first, second, and third photographs 310, 320, and 330 as a transition effect during display of the output image. The control unit 180 can further play a piece of calm background music with slow tempo and low volume as a sound effect during display of the output image. The editing effects may be selectively applied according to user settings. According to an exemplary embodiment, the mobile terminal may produce an output image by applying editing effects corresponding to color information reflecting a feeling and atmosphere of a selected photograph.

Thereafter, the control unit 180 displays the produced output image through the display unit 170 (S219). In the displayed output image, the first, second, and third photographs 310, 320, and 330 are switched with one another at a preset transition rate according to the set display sequence. At step S219, a piece of background music may also be played as a sound effect.

After viewing the output image, the user can decide whether to save the output image. If the user decides to save the output image (S221), the control unit 180 stores the output image in the memory unit 140 (S223). If the user decides not to save the output image, the control unit 180 ends the process without saving the output image.

As described above, the image production method automatically produces an output image according to color information of a selected photograph.

As apparent from the above description, exemplary embodiments of the present invention provide an image production method and apparatus for a mobile terminal, wherein an output image may be automatically produced by applying editing effects corresponding to color information of a particular photograph to the image data of photographs to be displayed.

In the description, color information of a single photograph is used to set editing effects. However, color information of two or more photographs can also be used to set editing effects, through accumulating and averaging color information and utilizing changes in color information.

It will be apparent to those skilled in the art that various modifications and variations can be made in the present invention without departing from the spirit or scope of the invention. Thus, it is intended that the present invention cover the modifications and variations of the invention provided they come within the scope of the appended claims and their equivalents.

What is claimed is:

1. An image production method that utilizes a control unit of a mobile terminal, comprising:
   receiving a selection of photographs to generate a slide show with the selected photographs;
   collecting color information from at least one of the selected photographs;
   determining a theme among a plurality of themes corresponding to the collected color information;
   applying, via the control unit, the theme to the slide show, wherein the theme comprises a plurality of predetermined parameters configured to control, in accordance with the theme, at least one presentation aspect of the slide show, wherein a range of the color information is divided into sub-ranges, the sub-ranges being associated with the plurality of themes, and wherein the theme is determined according to the sub-range, among the sub-ranges, corresponding to the collected color information.

2. The image production method of claim 1, wherein the color information at least further comprises at least one of:

color information elements of a single photograph, differences between corresponding color information elements of multiple photographs, and averages of the corresponding color information elements of the multiple photographs, wherein the color information elements comprise color distribution, color temperature, saturation, and brightness.

3. The image production method of claim 1, further comprising displaying the slide show such that the selected photographs are switched with one another in a preset sequence.

4. The image production method of claim 1, wherein the color information further comprises at least one of color distribution, color temperature, brightness, and saturation of the at least some of the selected photographs.

5. The image production method of claim 1, wherein the at least one presentation aspect of the slide show comprises transition effects between photographs of the slide show.

6. The image production method of claim 1, wherein the at least one presentation aspect of the slide show comprises sound effects.

7. The image production method of claim 1, wherein the theme is further determined based on the number of the selected photographs.

8. An image production apparatus for a mobile terminal, comprising:

an input unit to receive a selection of photographs; a control unit to:

collect color information from at least one of the selected photographs, determine a theme among a plurality of themes corresponding to the collected color information, and apply the theme to a slide show; and a display unit to display the slide show such that the selected photographs are switched with one another in a preset sequence, wherein the theme comprises a plurality of predetermined parameters configured to control, in accordance with the theme, at least one presentation aspect of the slide show, wherein a range of the color information is divided into sub-ranges, the sub-ranges being associated with the plurality of themes, and wherein the theme is determined according to the sub-range, among the sub-ranges, corresponding to the collected color information.

9. The image production apparatus of claim 8, wherein the color information at least further comprises at least one of:

color information elements of a single photograph, differences between corresponding color information elements of multiple photographs, and averages of the corresponding color information elements of multiple photographs, wherein the color information elements comprise color distribution, color temperature, saturation, and brightness.

10. The image production apparatus of claim 8, wherein the color information further comprises at least one of color distribution, color temperature, brightness, and saturation of the at least some of the selected photographs.

11. The image production apparatus of claim 8, wherein the at least one presentation aspect of the slide show comprises transition effects between photographs of the slide show.

12. The image production apparatus of claim 8, wherein the at least one presentation aspect of the slide show comprises sound effects.

13. An image production method that utilizes a control unit of a mobile terminal, comprising:

receiving a selection of photographs from a photograph list to generate a slide show with the selected photographs;

receiving a display sequence of the selected photographs;

collecting color information from the selected photographs;

determining a theme among a plurality of themes corresponding to the collected color information; and applying, via the control unit, the theme to the slide show, wherein the theme comprises a plurality of predetermined parameters configured to control, in accordance with the theme, at least one presentation aspect of the slide show, wherein a range of the color information is divided into sub-ranges, the sub-ranges being associated with the plurality of themes, and wherein the theme is determined according to the sub-range, among the sub-ranges, corresponding to the collected color information.

14. The image production method of claim 13, further comprising:

displaying the slide show in the received display sequence.

15. The image production method of claim 13, further comprising saving the slide show.

16. The image production method of claim 13, wherein the color information further comprises at least one of color distribution, color temperature, brightness, and saturation of the at least some of the selected photographs.

17. The image production method of claim 13, wherein the at least one presentation aspect of the slide show comprises transition effects between photographs of the slide show.

18. The image production method of claim 13, wherein the at least one presentation aspect of the slide show comprises sound effects.

* * * * *